TRANSMITTER BIASING CIRCUIT

Filed Aug. 5, 1943

INVENTOR.
JOHN J. SLATTERY
BY William D. Hall
Attorney.

Patented Aug. 29, 1950 2,520,174

UNITED STATES PATENT OFFICE 2,520,174

TRANSMITTER BIASING CIRCUIT

John J. Slattery, Spring Lake, N. J.

Application August 5, 1943, Serial No. 497,453

3 Claims. (Cl. 250—17)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to electron tube biasing means; and particularly the application thereof to U. H. F. pulse-modulated transmitters such as used for pulse-echo object location.

To keep the power dissipated in such transmitters down to a minimum, the radio frequency oscillator thereof is normally maintained inoperative by means of a high negative cutoff bias applied to the grids, or by applying insufficient or zero potential to the plates. The oscillator is made operative for short spaced intervals by means of high voltage pulses, developed in a modulator, which renders the grids or plates highly positive, so that the oscillator functions for the duration of each pulse.

To obtain maximum peak power output, said grids or plates should be rendered as highly positive as possible. However, to avoid possible overloading of the tubes under such conditions, self-biasing networks are usually inserted in the grid-cathode circuit which renders the steady grid bias increasingly negative in response to an increase in plate or grid current. To avoid poor regulation of such biasing voltages, the self-biasing networks are usually proportioned so that their time constants are considerably longer than the interval between pulses.

It has been found that the proportioning of such biasing networks so as to provide maximum protection against excessive plate or grid current conditions, often results in reduction of the peak power developed. This is due to the fact that the bias must be maintained so high that a substantial amount of positive pulse voltage must be applied to the oscillator electrodes before the tube begins to oscillate vigorously. Hence only a part of the pulse voltage is useful for generating powerful high frequency oscillations.

To overcome this difficulty, it is desirable to provide self-biasing means which will permit the oscillator to start oscillating vigorously early in the pulse modulation cycle and yet provide adequate protection against overloads.

It is, therefore, the main object of this invention to provide such self-biasing means. This is done by providing a network which develops two biasing components, one being substantially steady and the other fluctuating substantially in synchronism with the pulse modulation voltage. The fluctuating component is preferably slightly retarded with respect to said pulse modulation voltage so that at the beginning of the modulation cycle the negative bias on the oscillator tubes is lower, thus permitting an early start of vigorous oscillations. In this manner, both the plates and the grids of the oscillator are, in effect, modulated.

For a better understanding of the invention, together with other and further objects thereof, reference is had to the following description taken in connection with the accompanying drawings, and its scope will be pointed out in the accompanying claims.

Figure 1:
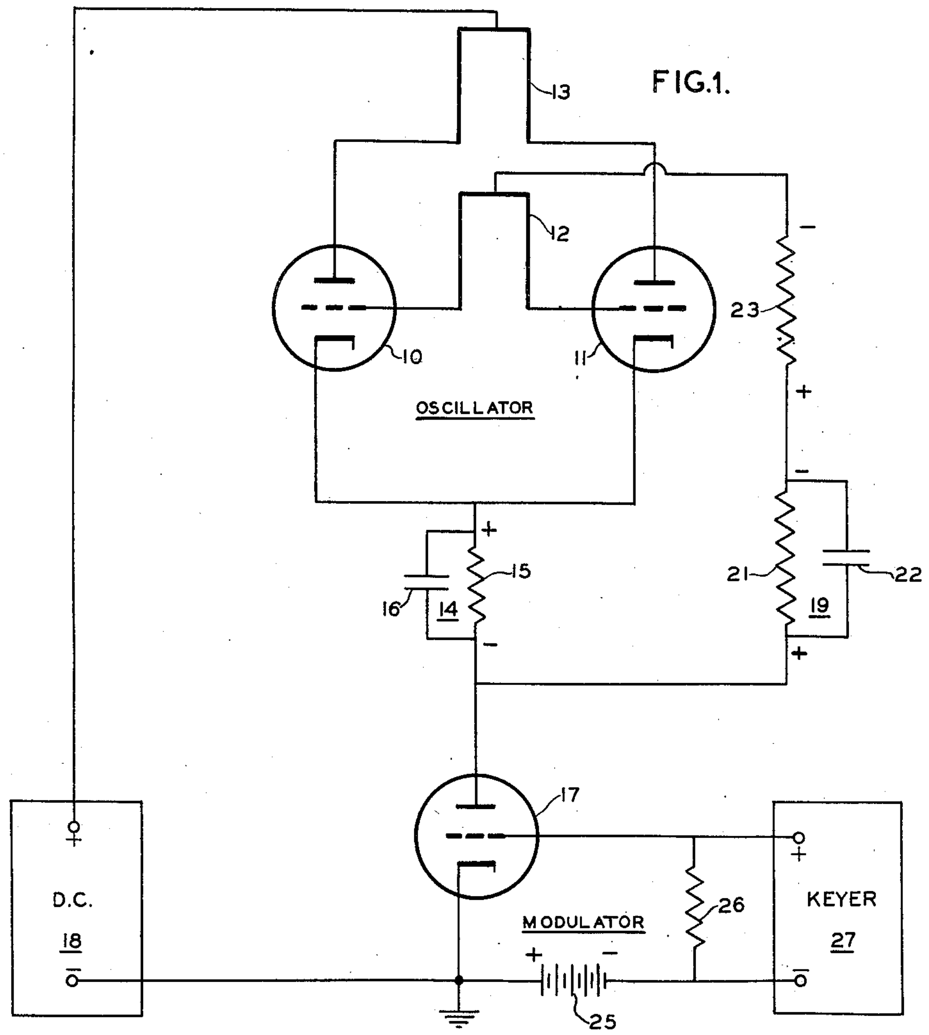
Fig. 1 is a schematic circuit of my invention.

Referring to Fig. 1, there is shown a conventional push-pull oscillator comprising triodes 10 and 11 and grid and plate tuning lecher lines 12 and 13, respectively. A transmission line (not shown) may be used to couple plate lecher 13 to an external circuit, such as an antenna.

The cathodes of tubes 10 and 11 are connected to one end of a biasing network 14, comprising a resistor 15 shunted by a condenser 16. The other end of network 14 is connected to the anode of a modulator tube 17. A source of B supply 18 is connected between the anodes of oscillator tubes 10 and 11 and the cathode of modulator tube 17, so that the space current paths of the oscillator and modulator tubes are connected in series.

Two additional grid biasing networks 19 and 23 are connected in series between the anode of tube 17 and the grids of the oscillator tubes. Network 19 includes a resistor 21 shunted by a condenser 22. Network 23 consists merely of a resistor without any capacity thereacross, except the distributed and stray capacities.

Modulator tube 17 is normally kept at plate current cutoff by means of a negative bias impressed on its grid from a source 25, through a high resistance 26. Since the space current paths of the oscillator and modulator are in series, the oscillator is likewise kept at cutoff by said negative bias.

Figure 2:
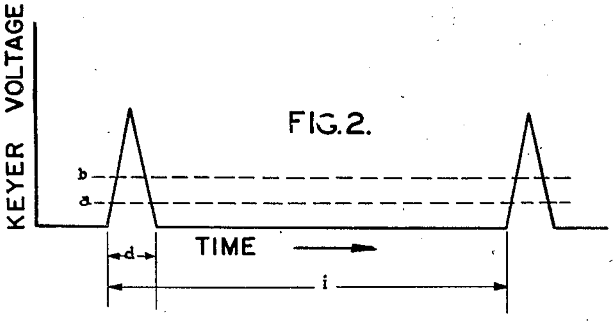
Fig. 2 is a wave diagram illustrating the operation of the invention.

Across resistor 26 there is impressed the output of a keyer 27, which generates a series of intermittent positive-going pulses of short duration *d* spaced at intervals *i* of considerably longer duration, as indicated in Fig. 2. Generally, the pulse duration is made as short as possible, usually a few microseconds, while the minimum spacing depends on the distances to be measured by the object location system in which the transmitter is incorporated. The repetition rate of said pulses, i. e. the pulse frequency, is relatively low; usually in the audio frequency region.

Each positive pulse is applied in opposition to the negative blocking bias on the grid of tube 17 and renders the grid highly positive, thus causing said tube to become highly conducting. As a result, the effective plate voltage applied between the anodes and cathodes of oscillator tubes 10 and 11 is increased to such an extent that the oscillator functions to generate a train of high frequency oscillations until the modulator impedance is again increased to a point where the effective voltage between the anode and cathode of the oscillator is reduced to a point below plate current cutoff.

Self-biasing networks 14, 19, and 23 protect the oscillator against excessive plate and grid currents. The three biasing networks develop voltages which are effectively in series between the oscillator cathodes and grids. Network 14 is in the cathode circuit and hence will develop voltages proportional to the cathode current. Networks 19 and 23 are in the oscillator grid circuit and hence they will develop voltages proportional to the grid current.

Between pulse intervals, the combined voltages of networks 14 and 19 are adapted to bias the oscillator grids negatively to a point below plate current cutoff. For this purpose, networks 14 and 19 are designed to develop steady voltages proportional to the cathode and grid currents respectively. The time constants of said networks must therefore be considerably longer than the interval *i* (Fig. 2) between pulses, so that substantially no decay of said bias occurs during said intervals. In practice said time constants are made about ten times as long as said interval, although shorter or longer time constants may be used. On the other hand, the time constant of network 23 is considerably shorter than the duration *d* of each pulse so that the bias voltage developed thereacross will substantially follow the envelope of the oscillator grid current.

A more detailed analysis of the operation of the system will now be given with reference to Fig. 2. Between pulses from keyer 27, the oscillator and modulator tubes are non-conducting and the resulting circuit can be considered, with little loss of generality, as the lumped capacitances of the oscillator and modulator circuits in series. The applied voltage from source 18 will therefore divide in inverse ratio of said capacitances. In this connection, it is important that the portion of the voltage across the oscillator tubes should not be greater than the amplification constant of said tubes multiplied by the steady grid bias, or $\mu E_g$, impressed thereon. Otherwise, a conduction current will be drawn.

As the voltage of the pulse impressed on the grid of the modulator rises to a level indicated by dotted line *a*, the negative blocking bias 25 is overcome and the modulator begins to conduct. At this point the oscillator still does not function since it is still biased to cutoff by biasing networks 14 and 19. Hence a displacement current flows through the capacitance represented by the blocked oscillator circuits in series with the resistance represented by the conducting modulator.

As the pulse voltage rises, the modulator impedance decreases until a point *b* is reached when the effective voltage between the plates and cathodes of the oscillator exceeds $\mu E_g$, at which point the oscillator tubes become conducting and oscillations begin to build up. These oscillations continue, as the effective plate voltage across the oscillator tubes rises to maximum, and stop when, on the downward swing of the modulation cycle, the effective plate voltage falls below the level required for conduction. Thus far, only the fixed oscillator grid bias provided by networks 14 and 19 has been described. The action of bias resistor 23 will now be considered.

To obtain maximum high frequency power output from the oscillator it is necessary that vigorous oscillation be obtained as soon as possible after the modulator begins conducting, i. e. the interval between points *a* and *b* must be reduced to a minimum. This can be done by reducing said fixed bias to a minimum. If this is done, however, a point is reached where excessive current may develop in the plates and grids, especially the latter, when the peak plate voltage is developed, resulting in excessive heating and quick breakdown of the tubes. Resistor 23 operates to reduce this tendency.

It will be recalled that no by-pass capacitor is used across resistor 23, the sole capacitance thereacross being the distributed and stray capacitances. The voltage across said resistor will therefore substantially follow the grid current envelope, except for a minute, and therefore negligible, delay due to said capacitances. If now the fixed bias provided by networks 14 and 19 is reduced to a point where the oscillator can start oscillating vigorously soon after the modulator starts conducting, resistor 23 will develop an increasing negative bias in response to increasing grid current as the effective voltage across the oscillator begins to approach its peak value, thereby preventing excessive grid and plate currents from developing.

The impedance of shunt capacities 16 and 22 must be sufficiently low to pass all the pulse and the residual radio frequency components. The stray inductance of the biasing resistors must be kept down to a minimum.

In some cases biasing network 19 may be eliminated, since resistor 23 may be proportioned to afford sufficient protection against excessive grid current. An unbypassed resistor can be inserted in the oscillator cathode circuit instead of the grid circuit as shown, or networks of this type may be placed in both circuits.

Resistor 23 also functions to protect the oscillator against excessive plate and grid currents when the keyer voltage is first connected into the modulator circuit. This is due to the fact that the fixed bias voltage across networks 14 and 19 reach their full value only after a substantial number of pulses, due to the long time constant of said networks.

In one system, using a four tube oscillator incorporating this invention, the following component values were found suitable: Resistors 15, 21, and 23 were 5000 ohms, 25,000 ohms, and 500 ohms, respectively. Condensers 16 and 22 were 1.0 mfd. and 0.1 mfd., respectively. For values suitable for a sixteen tube oscillator to which this invention was applied, reference is made to the application of M. D. Baller; Serial No. 477,103; filed March 8, 1943, now Patent No. 2,497,854, dated February 21, 1950. It is to be distinctly understood, however, that these values are given for purposes of example only, since they depend on many design factors, e. g. the natural frequency of the oscillator, the pulse frequency, the plate and grid currents developed, etc.

The biasing circuits are not restricted for use with the specific oscillator or modulator circuits shown, but are of general application. For another type of transmitter-modulator system using this invention reference is made to the Baller application, supra. This invention is also applicable to power amplifiers such as used in the final stage of a master oscillator-power amplifier type of transmitter, wherein the pulse modulation is applied to said final stage. Other equivalent uses will be obvious to one skilled in the art.

There has thus been described a biasing system for a pulse modulated transmitter which permits said transmitters to start oscillating vigorously early in the modulation cycle and still protects the same against excessive plate and grid currents at the peak of said cycle. This is done by providing a compound grid bias network between the grids and cathodes of the transmitter tubes, a portion of said network having a time constant considerably smaller than the duration of the pulse so that the voltage thereacross substantially follows the envelope of the currents developed in the transmitter. A second portion has a time constant considerably longer than said pulse duration, and preferably many times as long as the interval between pulses, so that a steady voltage is developed which is substantially proportional to plate or grid current, or both. Thus modulation of the transmitter is in effect accomplished by varying both grid and plate potentials.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. A transmitter including a normally inoperative electron tube having a cathode, grid, and anode, and means for intermittently applying a direct current operating potential to the circuit of said anode and cathode for rendering said tube operative for predetermined intervals of relatively short duration separated by considerably longer predetermined fixed intervals, means to stabilize the power output of said tube during said short duration intervals comprising biasing means for negatively biasing said grid with respect to said cathode, one portion of said biasing means developing a voltage dependent upon the grid current in said tube, another portion of said biasing means developing a voltage dependent upon the cathode current in said tube, the time constant of one of said portions being less than the duration of said short duration intervals and the time constant of the other of said portions being greater than said longer intervals.

2. A radio transmitter comprising a normally inoperative oscillator including an electron tube having a cathode, grid, and anode, and means for intermittently applying a direct current operating potential to the circuit of said anode and cathode for rendering said tube operative for predetermined relatively short pulse intervals separated by considerably longer predetermined fixed intervals, means to stabilize the power output of said tube during successive intervals of operation comprising biasing means for negatively biasing said grid with respect to said cathode, a first portion of said biasing means developing a voltage dependent on the grid current in said tube and having a time constant less than said pulse intervals, a second portion of said biasing means developing a voltage dependent upon the cathode current in said tube and having a time constant substantially greater than said longer intervals.

3. A radio transmitter comprising a normally inoperative oscillator including an electron tube having a cathode, grid, and anode, means for generating direct current potential pulses having a fixed repetition frequency, and means for applying said potential pulses to the circuit of said anode and cathode for rendering said tube operative for predetermined relatively short pulse intervals separated by considerably longer predetermined fixed intervals, means to stabilize the power output of said tube during successive intervals of operation comprising biasing means for negatively biasing said grid with respect to said cathode, a first portion of said biasing means developing a voltage dependent on the grid current in said tube and having a time constant less than said pulse intervals, a second portion of said biasing means developing a voltage dependent upon the grid current in said tube and having a time constant substantially greater than said longer intervals, a third portion of said biasing means developing a voltage dependent upon the cathode current in said tube and having a time constant substantially greater than said longer intervals.

JOHN J. SLATTERY.

REFERENCES CITED

The following references are of record in the file of this patent:

UNITED STATES PATENTS

| Number | Name | Date |
|---|---|---|
| 1,868,033 | Urtel | July 19, 1932 |
| Re. 18,756 | Jenkins | Mar. 7, 1933 |
| 2,034,899 | Ditcham | Mar. 24, 1936 |
| 2,082,472 | Tunick | June 1, 1937 |
| 2,229,029 | Wassell | Jan. 21, 1941 |
| 2,333,688 | Shepard, Jr. | Nov. 9, 1943 |
| 2,335,278 | Hilferty | Nov. 30, 1943 |
| 2,406,839 | Labin et al. | Sept. 3, 1946 |
| 2,408,076 | Labin | Sept. 24, 1946 |